United States Patent [19]

Tomantschger et al.

[11] Patent Number: 4,900,642
[45] Date of Patent: Feb. 13, 1990

[54] CATALYTIC RECOMBINATION OF EVOLVED OXYGEN IN GALVANIC CELLS

[75] Inventors: Klaus Tomantschger, Mississauga, Canada; Karl Kordesch, Graz, Austria

[73] Assignee: Battery Technologies Inc., Mississauga, Canada

[21] Appl. No.: 405,309

[22] Filed: Sep. 11, 1989

Related U.S. Application Data

[63] Continuation of Ser. No. 234,922, Aug. 22, 1988, abandoned.

[30] Foreign Application Priority Data

Oct. 27, 1987 [CA] Canada .................... 550335

[51] Int. Cl.$^4$ .......................... H01M 10/52
[52] U.S. Cl. ...................... 429/59; 429/229
[58] Field of Search .......... 429/59, 60, 57, 229

[56] References Cited

U.S. PATENT DOCUMENTS

| | | | |
|---|---|---|---|
| 3,350,225 | 10/1967 | Seiger | 429/59 |
| 3,438,812 | 4/1969 | Cherney et al. | 429/59 |
| 3,536,537 | 10/1970 | Solomon | 429/59 |
| 4,246,326 | 1/1981 | Sprengel et al. | 429/59 |

FOREIGN PATENT DOCUMENTS 0290668  12/1986  Japan .

Primary Examiner—Donald L. Walton

[57] ABSTRACT

In rechargeable, electrochemical cells, oxygen may evolve on charge, overcharge or any reversal of polarity. The invention concerns an auxiliary, electrochemical, transfer electrode to catalyze the recombination of such oxygen with the anode mass. The auxiliary electrode comprises porous carbon bonded with PTFE and is used in a cell having a zinc anode, a metal oxide cathode and an aqueous alkaline electrolyte contacting both anode and cathode.

6 Claims, 1 Drawing Sheet

CATALYTIC RECOMBINATION OF EVOLVED OXYGEN IN GALVANIC CELLS

CROSS REFERENCE

This is a continuation application of Ser. No. 234,922 filed Aug. 22, 1988, now abandoned.

FIELD OF THE INVENTION

This invention relates to galvanic cells having means to recombine evolved oxygen with the negative electrode active mass. Recombination of oxygen avoids the loss of water and reduces the risk of pressure build up in the cell. It is of particular importance in relation to sealed cells such as rechargeable alkaline cells e.g., zinc/manganese dioxide cells with a potassium hydroxide electrolyte. The present invention may provide economic means of accelerating the consumption of oxygen by the anode. Oxygen gas build up is mitigated by oxygen reduction to OH' or water, and oxidation of the respective amount of anode active material. In all cases, the catalytically active material maintains electronic and ionic contact with the respective active battery electrode.

BACKGROUND OF THE INVENTION

The prior art has concerned itself, for many years, with the problem of reducing or eliminating the loss of water in galvanic cells using aqueous electrolyte and avoiding build up of excessive gas pressure in sealed cells. Oxygen gas is evolved during overcharge or cell reversal.

Several galvanic couples are known with a capability of oxygen recombination cycles; however, the recombination rates are not always as fast as might be desired. PbO2-Pb and Ni-Cd, for example, show high rates of oxygen recombination, while batteries employing Zn anodes (Ni-Zn), MnO2-Zn, HgO-Zn) exhibit low rates. Reference to the theory of this lead-acid battery oxygen recombination for instance is made in "Batteries, Vol. 2, Lead-Acid Batteries and Electric Vehicles" pp. 69-61 by K. Kordesch; and to the Ni-Cd couples in "Alkaline Storage Batteries", by A. Salkind. The reduction to practice, though, has not been easy and a variety of difficulties has been reported: such as sealing problems, negative "fade" (e.g. passivation of the negative cadmium electrode with time), gradual decrease in effectiveness of the negative active material reserve which is provided in some designs in order to minimize—if not entirely suppress—hydrogen evolution during charge and overcharge, the general problem of coping with the recombination of nonstoichiometrically evolving oxygen and hydrogen, etc.

Three approaches are often used in efforts to solve these problems. These approaches are:

(1) Operation of the "oxygen cycle". Hydrogen evolution is suppressed and the evolved oxygen (during charge and overcharge) is recombined at the always partially discharged negative electrode [U.S. Pat. No. 3,258,360 (1966)].

(2) Catalytic recombination of hydrogen and oxygen inside or outside the battery; in the latter case, provisions are made for the return of the product water to the electrolyte chamber [U.S. Pat. No. 3,630,778 (1971), U.S. Pat. No. 3,598,653 (1971), U.S. Pat. No. 3,622,398 (1971), U.S. Pat. No. 3,701,691 (1972)].

(3) Use of an auxiliary (third) electrode as overcharge recombination reactors, as described in "Electrochem. Technol.," 4, 383 (1966) by P. Ruetschi and J. B. Ockerman.

It has now been unexpectedly discovered that the addition of a disc of carbon bonded with polytetrafluoroethylene (PTFE) as an electrochemical, transfer electrode for the anode mass, has the effect to enhance oxygen recombination at the anode.

According to the present invention, there is provided a rechargeable electrochemical cell having a metal oxide cathode, a zinc anode, and an aqueous alkaline electrolyte contacting the anode and the cathode, in which cell oxygen may evolve on charge, overcharge, or any reversal of cell polarity. The cell includes an auxiliary, electrochemical, transfer electrode for the anode. The auxiliary electrode is physically separated from the anode but is in electronic and ionic contact with it, and is at least partially wetted by the electrolyte. The auxiliary electrode comprises porous carbon bonded with polytetrafluoroethylene.

The metal oxide of the cathode may be manganese dioxide, which may be mixed with graphite in an amount of from 5% to 20% by weight, or may be mixed with nickel oxide in an amount of from 10% to 20% by weight. Alternatively the metal oxide may be nickel oxide, silver oxide or iron oxide and may be mixed with graphite in an amount of from 5% to 20% by weight.

The present invention may provide economic and effective means of reabsorbing oxygen gas in galvanic cells.

Embodiments of the invention will now be described by way of illustration with reference to the drawings in conjunction with the Example, describing an electrode of the invention, and its operating characteristics.

DESCRIPTION OF THE PREFERRED EMBODIMENTS

Figure 1:
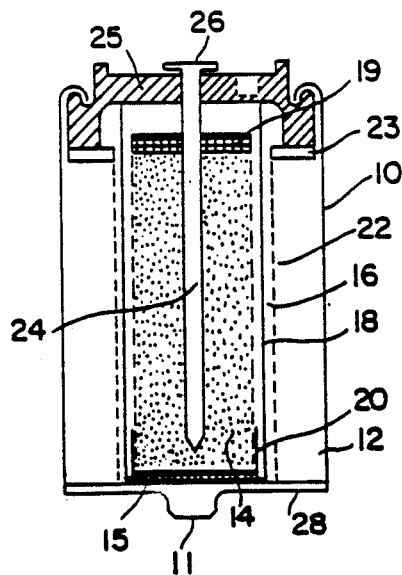
FIG. 1 is a vertical cross section of a typical embodiment of the invention.

FIG. 1 of the drawings shows a typical embodiment of a cell according to the present invention. The cell comprises a steel can 10 housing a conventional metal oxide cathode 12. The base of can 10 has a boss 11 forming the cathode contact, formed cylindrically around anode 14. The cathode 12 may comprise finely divided manganese dioxide and graphite, and is separated from anode 14 which may comprise zinc powder, by an electrolyte permeable separator 16. The electrolyte, which may be aqueous potassium hydroxide, permeates the zinc powder of anode 14, and cathode 12, through separator 16. The cathode 12 may also be provided with auxiliary cathode material to catalyse the reabsorbtion of hydrogen as described in copending application No. 234,749, filed of even date herewith in the names of KORDESCH and TOMANTSCHGER.

As shown, the anode is confined by a basket 18, made for example, of Chicopee TM Rayon/polyvinyl acetate. The basket 18 also carries an auxiliary, electrochemical, transfer electrode 19 comprising a disk of porous carbon bonded with PTFE. The auxiliary electrode 19 is wetted by the electrolyte. The basket 18 is provided with an end cap 20, for example of brass, insulated from the base of can 10 by insulating disc 15. The cathode 12 is confined into cylindrical shape by screen 22 and annular plastic cap 23.

A current collector nail 24 projects into the anode 14 through a casing cover 25, with its head 26 being outside of the cover 25 to form the anode contact. The cover 25 seals the can 10 by crimping formed around its edge.

EXAMPLE

A conventional gelled or immobilized zinc anode as used in primary alkaline or rechargeable alkaline MnO2-Zn cells was formed, extruded into a separator basket (Chicopee Rayon/PVA), and placed in the center of a C cell can employing a polyethylene spacer, as shown in FIG. 1.

Suitable Anode Compositions are:

(A) 61.4% 3% or 6% Hg New Jersey TM 1205 Zn
    2.0% ZnO
    1.0% MgO
    0.8% 70/30 CMC/940 (or Carbopol TM)
    34.8% 9 N KOH with 8% ZnO
    Total weight: 8.7 g (B) 50.0% amalgamated Zn
    20.0% Ca(OH)2
    30.0% 9 N KOH with 8% ZnO
    Total weight: 8.7 g An oxygen reduction electrode was prepared by forming a 400 micron layer comprising a mixture of carbon available commercially as "SHAWINIGAN BLACK" TM and PTFE. A separator sheet (Dexter TM C1235) was pressed in one side and a Ni screen into the other side of the carbon/PTFE layer, comprising 62.5% carbon and 37.5% PTFE. A disc with a diameter of 11 mm was punched out of the foil and the carbon disc placed on the top of an anode (which was formed, for example, from either of the above compositions) with the separator side facing the zinc. Thereafter, the brass nail current collector was driven through the carbon disc into the gelled anode.

The function of the separator disc is to soak up electrolyte assisting in partial wetting of the carbon disc by the electrolyte. The brass nail penetrates both electrodes assuring electronic contact of the two electrodes, and thereby establishing a "zinc-oxygen short circuit element".

To demonstrate the capability of the present invention in terms of oxygen recombination, two half cells of the C-cell size were fabricated, one with and one without the carbon disc. Both open cells were placed vertically in a tube, the cathode void was filled with 9N KOH to the height of the polyethylene spacer and the cells were galvanostatically discharged at 50 mA for 20 hours removing 1 Ah of the negative electrodes (total capacity appr. 4 Ah). Cell tops used to close the elements contained tube fittings attached to U tubes filled with water by means of flexible tubing. After crimping, the cells were gas tight and any pressure change was indicated by the manometers.

Figure 2:
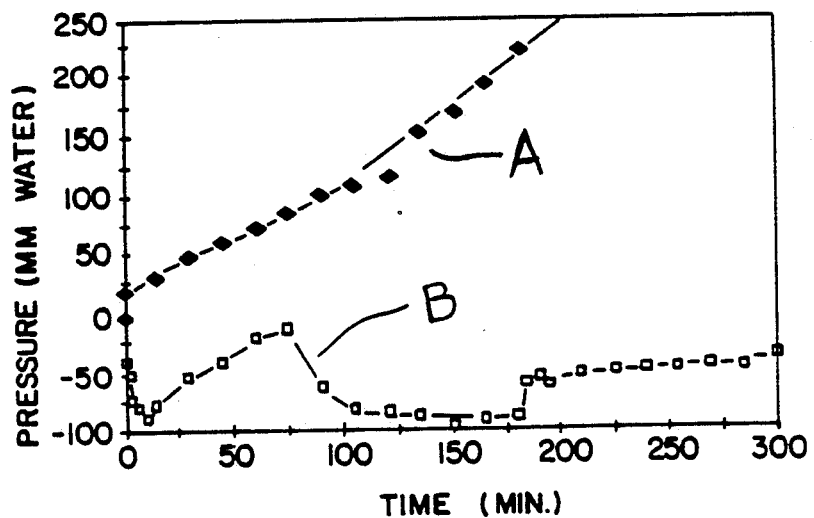
FIG. 2 is a graph comparing the operating characteristics of prior art and an inventive cell, as described in the Example.

Both cells were galvanostatically charged with 50 mA for three hours at room temperature. The negative electrode reaction consisted of reduction of ZnO to metallic Zn. The counter reaction involved generation of oxygen on the surface of the can at a rate of 10 ml oxygen per hour (at 50 mA). FIG. 2 shows the resulting pressure curves.

Curve A represents pressure increase with time for the conventional cell without the carbon electrode. Curve B illustrates similar data for the cell containing the catalytically active disc. This cell developed a significant underpressure after cell closure, which is due to the reduction of the air oxygen present in the gas space of the cell. During that three hours of overcharge at 50 mA, the 1 square cm disc recombined 30 ml NPT of oxygen gas by maintaining lower than atmospheric pressure. An increase in the overcharge current to 100 mA (20 ml oxygen per hour) caused the pressure to stablize at a somewhat higher value; however, still below atmospheric pressure. No significant pressure change was observed over a period of two hours, indicating the recombination of additional 40 ml oxygen gas evolved during change. The maximum gas recombination rate was determined to be 25 ml oxygen per hour per $cm^2$ electrode area—equivalent to an oxygen evolution current of 120 mA which, for the cell size used, is significantly more than required under "realistic user conditions".

The present invention may provide economic and effective means of removing oxygen gas in galvanic cells. In alkaline electrolytes, carbon materials generally comprise sufficient catalytic activity for oxygen reduction. Similar electrodes, using noble or non noble metal oxide catalysts are described in co-pending application No. 234,933, filed of even date herewith, for "Metal and Metal Oxide Catalyzed Electrodes for Electrochemical Cells, and Methods of Making Same" by K. Kordesch and K. Tomantschger. They may be employed if higher recombination current densities are desireable.

To determine the long term electrode performance a half cell containing a catalytically active disc as described was operated continously at 20 mA/cm2 for 365 hours, and thereafter the current density was increased to 50 mA/cm2. The test was discontinued after consumption of in excess of 3.5 liters NPT oxygen. The following table demonstrates the performance obtained in 6N KOH electrolyte at room temperature, for air as reaction gas (use of oxygen led to an increase in potential by 40-50 mv):

| time [hrs.] | Oxygen Comsumption [ml] | Current [mA/cm2] | IR Free Potential [mV vs Zn] |
| --- | --- | --- | --- |
| 0 | 0 | 20 | 1126 |
| 24 | 100 | 20 | 1191 |
| 48 | 199 | 20 | 1183 |
| 96 | 398 | 20 | 1179 |
| 145 | 602 | 20 | 1174 |
| 194 | 805 | 20 | 1190 |
| 290 | 1203 | 20 | 1168 |
| 338 | 1406 | 20 | 1163 |
| 365 | 1519 | 50 | 1217 |
| 365 | 1519 | 50 | 1164 |
| 389 | 1768 | 50 | 1163 |
| 413 | 2015 | 50 | 1128 |
| 461 | 2515 | 50 | 1130 |
| 509 | 3012 | 50 | 1100 |
| 565 | 3593 | 50 | 1066 |

[The IR free potential is determined using laboratory procedures and standards, and is measured in millivolts as against the Reversible Hydrogen Electrode Reference].

We claim:

1. A rechargeable electrochemical cell having a cylindrical metal oxide cathode, a cylindrical zinc anode, a current collector extending into said anode and an aqueous alkaline electrolyte contacting the anode and cathode, in which cell oxygen may evolve on charge, overcharge, or any reversal of cell polarity; the cell including an auxiliary transfer electrode provided for the anode and physically separated therefrom by a separator sheet but in electronic and ionic contact with said anode, said auxiliary transfer electrode being at least partially wetted by said electrolyte and thereby establishing said ionic contact between said auxiliary transfer electrode and said anode; said auxiliary transfer electrode comprising porous carbon bonded with polytetrafluoroethylene; wherein said current collector pierces said auxiliary transfer electrode and thereby establishes said electronic contact between said auxiliary transfer electrode and said anode; whereby oxygen evolved within said cell is recombined by said auxiliary transfer electrode.

2. The rechargeable cell of claim 1, wherein the metal oxide is manganese dioxide and is mixed with graphite in an amount of from 5% to 20% by weight.

3. The rechargeable cell of claim 1 where the metal oxide is selected from silver oxide, nickel oxide, iron oxide and manganese dioxide.

4. The rechargeable cell of claim 3, where the metal oxide is manganese dioxide and is mixed with nickel oxide in an amount of from 10% to 20% by weight.

5. The rechargeable cell of claim 1, wherein said auxiliary transfer electrode comprises a mixture of 62.5% carbon and 37.5% PTFE.

6. The rechargeable cell of claim 2, wherein said anode is a gelled zinc anode.

* * * * *